United States Patent [19]
Worgan et al.

[11] 4,089,190
[45] May 16, 1978

[54] CARBON FIBER DRIVE SHAFT

[75] Inventors: Gordon Peter Worgan; Derek Reginald Smith, both of Bristol, England

[73] Assignee: Union Carbide Corporation, New York, N.Y.

[21] Appl. No.: 676,856

[22] Filed: Apr. 14, 1976

[51] Int. Cl.² ............................................... F16C 1/00
[52] U.S. Cl. ........................................ 64/1 S; 64/2 R; 64/1 R; 138/130
[58] Field of Search ................. 64/1 R, 1 S, 1 C, 2 R, 64/1 V; 138/130, 144, DIG. 7

[56] References Cited
U.S. PATENT DOCUMENTS

| | | | |
|---|---|---|---|
| 2,573,361 | 10/1951 | Rodgers, Jr. et al. | 64/2 R |
| 3,604,463 | 9/1971 | McLarty | 138/144 |
| 3,651,661 | 3/1972 | Darrow | 64/1 R |
| 3,659,434 | 5/1972 | Wolfe | 64/1 R |
| 3,970,495 | 7/1976 | Ashton et al. | 138/144 |

OTHER PUBLICATIONS

"Low-Cost High-Performance Carbon Fibers," Chambers, *Mechanical Engineering*, Dec. 1975, pp 37–41.
"Advanced Fiber-Resin Composites," Berg, *Machine Design*, Apr. 1, 1971.

*Primary Examiner*—Benjamin W. Wyche
*Assistant Examiner*—R. C. Turner
*Attorney, Agent, or Firm*—John S. Piscitello

[57] ABSTRACT

Lightweight tubular drive shafts having noise and vibration dampening characteristics, and capable of operating at high speeds without significant misalignment between their geometric axes and their axes of rotation, are prepared by forming the shafts so that the walls thereof are a composite of a plurality of layers of carbon fibers in a solid resin matrix wherein the fibers are disposed circumferentially and helically about the longitudinal axis of the shaft.

37 Claims, 1 Drawing Figure

U.S. Patent May 16, 1978 4,089,190
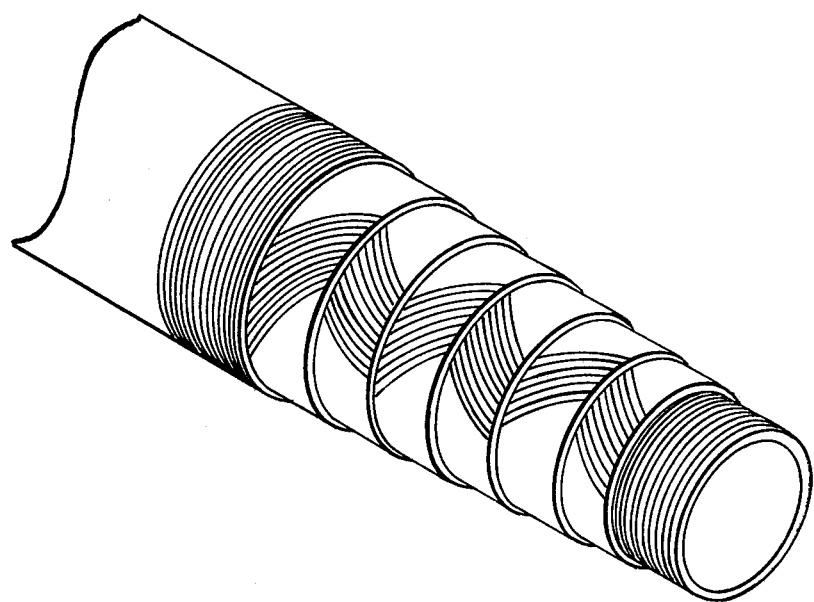

CARBON FIBER DRIVE SHAFT

BACKGROUND OF THE INVENTION

This invention relates to improved drive shafts. More particularly, this invention relates to lightweight drive shafts having noise and vibration dampening characteristics.

The function of a drive shaft is to convey torque from a power source to a means for converting this energy into useful work. In the case of conventional automobiles, and other vehicles, the drive shaft conveys torque from the transmission to the differential where it is converted into the drive force for the rear wheels of the vehicle.

Conventionally, automotive drive shafts are constructed of steel, or similar dense material, and have a diameter and thickness which enables them to meet the required torque carrying capacity. However, not only are such conventional shafts undesirably heavy, but, in addition, they have a high longitudinal stiffness, e.g., a longitudinal Young's modulus of elasticity of about $30 \times 10^6$ psi. The excessive weight of such shafts significantly increases the cost of producing and running the vehicle, while the high stiffness of these shafts causes lateral vibrations originating in the engine and transmission to be readily transmitted to the differential when the engine is operated at high speed, resulting in considerable noise in the bearings of the differential. This noise problem is particularly prevalent in smaller cars having smaller engines which are constructed to provide a greater number of crankshaft revolutions per minute than larger cars with larger engines. With the accelerating trend toward smaller cars and energy conservation, this problem has increased greatly in importance. While the problem of vibrations transmitted to the differential by the drive shaft can be overcome to some degree by the use of universal joints within the shaft, this solution adds additional weight to the car, or other vehicle, and further increases the cost and expense of producing and running the vehicle.

Another problem associated with conventional automotive drive shafts is that they sometimes go out of round when rotated, i.e., they undergo diametric distortion, causing a noise described by the automotive industry as high speed "boom". The tendency to go out of round can be reduced by increasing the thickness of the walls of the shaft, but once again only at the expense of adding further weight and cost to the vehicle. In addition, the greater wall thickness further increases the longitudinal stiffness of the shaft, and this magnifies the noise problem in the bearings of the differential.

Drive shafts made from composites of filamentary material, such as boron or carbon fibers, embedded in a solid resin matrix have also been proposed as the rotary means for helicopter blades. In all such shafts, a majority of the fibers employed have always been disposed parallel to the axis of the shaft in order to impart maximum stiffness to the shaft to enable it to resist the high lateral forces to which such shafts are subjected, and none of these shafts have been disigned to overcome the noise and vibration problems associated with the transfer of torque from the engine and transmission to the differential in high speed small engine cars.

SUMMARY OF THE INVENTION

In accordance with the present invention, it has been discovered that lightweight, tubular drive shafts having noise and vibration dampening characteristics, and capable of operating at high speeds without significant misalignment between their geometric axes and their axes of rotation, can be prepared by forming said shafts so that the walls thereof are a composite of a plurality of layers of carbon fibers in a solid resin matrix wherein the fibers are disposed circumferentially and helically about the longitudinal axis of the shaft. In such shafts, the fibers in the outermost and innermost layers are disposed substantially circumferentially about the longitudinal axis of the shaft at an angle of from 85° to 90° to a line in the shaft parallel to the longitudinal axis, and the fibers of at least four intermediate layers between the innermost and outermost layers are helically disposed about the longitudinal axis at an angle of from 15° to 50° to a line in the shaft parallel to the longitudinal axis of the shaft. These helical layers are arranged so that the fibers thereof cross the fibers of the previous helical layer at an angle of from 30° to 90° (the smaller of the two angles formed by the intersection of the two fiber layers is from 30° to 90°). Shafts designed in this manner have been found to exhibit superior noise and vibration dampening characteristics, and to be capable of operating at speeds of at least 6000 rpm., up to 8000 rpm., or more, without significant misalignment between their geometric axes and their axes of rotation. Such misalignment, known as "whirling", has been found to occur in composite shafts when they are subjeced to rotation at high speeds where the centrifugal forces created tend to overcome the forces due to stiffness. The lateral deflection of the shafts caused by this high speed rotation results in a substantial loss of power and increases bearing wear.

DESCRIPTION OF THE DRAWINGS

The drawing shows a sectional cutaway perspective view of a portion of a carbon fiber composite drive shaft wherein, for clarity, only a portion of the carbon fibers present are illustrated. The shaft shown is made up of eight layers of resin-impregnated continuous lengths of carbon fiber disposed circumferentially and helically about the longitudinal axis of the shaft. The fibers of the innermost and outermost layers are disposed substantially circumferentially about the longitudinal axis at an angle of about 87° to a line in the shaft parallel to the longitudinal axis of the shaft. Between these two substantially circumferential layers are six intermediate layers wherein the fibers are helically disposed about the longitudinal axis at an angle of about 22.5° to a line in the shaft parallel to the longitudinal axis of the shaft, with the fibers of each successive helical layer crossing the fibers of the previous helical layer at an angle of about 45° (the smaller of the two angles formed by the intersection of the two fiber layers is about 45°).

DETAILED DESCRIPTION OF THE INVENTION

The drive shafts of the present invention are usually constructed so as to be capable of delivering torque loads up to 12,000 pound feet, e.g., from about 800 pound feet up to 12,000 pound feet. In order to obtain such torque capacity with shafts having a length and diameter suitable for use in most conventional automobiles, i.e., 40–50 inches long and 2–3 inches in inner diameter, the walls of the shaft should be at least 0.06 inches thick, and the carbon fibers employed in the shaft should have a Young's modulus of elasticity of at least $25 \times 10^6$ psi. Usually, the walls of the shaft are from 0.08 to 0.25 inches thick and the fibers have a minimum modulus of elasticity of $30 \times 10^6$ psi. The carbon fibers employed in the shaft can be prepared as described in U.S. Pat. Nos. 3,454,362 and 3,412,062, and U.K. Pat. No. 1,416,614. The term "carbon" as used herein is intended to include both graphitic and non-graphitic fibers.

In order to keep noise at a minimum when the shaft is rotating at speeds of over 1000 rpm. to in excess of 6000 rpm. (engines operating at crankshaft speeds of 4000 rpm. to 8000 rpm. produce speeds of 1000 rpm. to 8000 rpm. in the drive shaft, depending upon the gear ratio selection in the transmission), it has been found that the product of the longitudinal Young's modulus of the shaft times the second moment of area of the shaft divided by the length of the shaft to the fourth power should not exceed unity, i.e., the value of $$EI/L^4$$

should not be greater than 1, wherein
 $E$ = longitudinal Young's modulus of the shaft (psi.)
 $L$ = length of the shaft (inches), and
 $I$ = second moment of area of the shaft (inches$^4$), i.e., $\pi r^3 t$ for thin walled shafts, where $r$ is the mean radius of the shaft (inches), and $t$ is the thickness of the shaft walls (inches)

To obtain a value no greater than unity in the above formula, the shaft should ordinarily have a maximum Young's modulus of $8 \times 10^6$ psi., preferably no more than $6 \times 10^6$ psi. Shafts with a higher Young's modulus have been found to be measurably noisier.

In order to prevent the whirling phenomenon from occurring when the shaft is rotating at speeds of over 1000 rpm. to in excess of 6000 rpm., the value obtained above should be at least 40 times greater than the product of the mean shaft diameter times the shaft thickness times the average density of the shaft wall, i.e., the value of $$EI/L^4 DPt$$

should be at least 40, wherein
 $E$, $I$ and $L$ are as defined above,
 $D$ = mean diameter of the shaft (inches)
 $P$ = average density of the shaft wall (lb./in.$^3$), and
 $t$ = thickness of the shaft walls (inches)

When the value of the formula is at least 40, the centrifugal forces created upon rotation are counterbalanced by the forces due to stiffness, so that the shaft does not undergo the whirling phenomenon.

When the carbon fibers employed in the drive shafts of the present invention have a Young's modulus of elasticity of at least $25 \times 10^6$ psi., it is possible to completely eliminate the use of fibers aligned parallel to the longitudinal axis of the shaft. As a result, the excessive longitudinal stiffness which characterized drive shafts in the past, and resulted in the transmittal of excessive vibration from the engine and transmission to the differential, has been eliminated, together with the noise problems associated with this excessive stiffness which automotive manufacturers have vainly sought to eliminate. When fibers having a Young's modulus below $25 \times 10^6$ psi. are employed, however, it is necessary for 10 to 20 percent by weight of the fibers to be disposed parallel to the longitudinal axis of the shaft in order to impart sufficient stiffness to the shaft to prevent whirling from occurring. Thus, e.g., in shafts containing seven layers of fibers, one of the layers may be longitudinally disposed parallel to the axis of the shaft. In shafts containing 10 layers of fibers, one or two layers may be longitudinally disposed parallel to the axis of the shaft.

Preferably only carbon fibers are employed in the drive shafts of the present invention because of their low weight and high modulus. However, if desired, other filamentary material can be employed together with carbon fibers to form a hybrid shaft. These fibers may be admixed together with the carbon fibers in one or more of the individual layers, or they may be employed alone in separate layers, provided the total weight of such fibers does not exceed 80 percent of the total weight of the fibers employed in the shaft. Usually they are present in amounts of from 40 percent by weight to 65 percent by weight of the total weight of the fibers. Among the fibers which can be employed are glass, boron and organic fibers such as polyamide fibers sold under the trade name "Kevlar"* 49. For best noise dampening effect, the outermost and innermost circumferentially disposed fiber layers should contain carbon fibers.

*"Kevlar" is a registered trademark of E. I. du Pont de Nemours and Co.

The drive shafts of the present invention can be fabricated employing conventional sheath winding techniques. Continuous fiber lengths, preferably in the form of roving, yarn or tow, are impregnated with a suitable resin binder, and the impregnated fibers are wound on a mandrel in the desired manner. To facilitate winding, it is preferred that the fibers have a tensile strength of at least 200,000 psi. While it is preferably to impregnate the fibers as they approach the mandrel, it is possible to first form a prepreg of the fibers and binder, and then wrap the prepreg about the mandrel. In any event, each wrap is laid so as to leave no space between the turns which make up the wrap, and so as to completely cover the surface upon which it is laid without overlapping upon itself. The circumferential wraps which make up the innermost and outermost layers of the shaft are wound at an angle of from 85° to 90° to a line in the mandrel parallel to the longitudinal axis of the mandrel. The intermediate helical wraps are wound at an angle of from 15° to 50° to a line in the mandrel parallel to the longitudinal axis of the mandrel. Each successive intermediate wrap is disposed so that the fibers thereof cross the fibers of the previous intermediate wrap at an angle of from 30° to 90° (the smaller of the two angles formed by the intersection of the two fiber wraps is from 30° to 90°). As indicated above, at least four intermediate helical wraps are disposed between the outermost and innermost circumferential wraps. Usually a total of between 8 and 10 wraps are employed, although more or less wraps can be employed as desired. Each such wrap usually varies in thickness from 0.004 to 0.016 inches. If desired, one or more intermediate longitudinal or circumferential wraps may be employed. Such wraps may employ carbon fibers or other filamentary material or both as desired. Longitudinal wraps cannot be laid by sheath winding techniques, of course, and must first be cut to size before they are laid in place. After all the wraps are in place, the binder is cured and the shaft is removed from the mandrel. If necessary, the ends of the shaft may be trimmed.

The fibers employed in the preparation of the drive shafts of the present invention are impregnated with a suitable low viscosity liquid resin binder before they are wound by simply immersing the fibers in the resin. The resins used to impregnate the fibers include, among others, phenolic resins, epoxy resins, polyester resins, and the like. Conventional hardening agents and/or polymerization catalysts which cause crosslinking of the resin, are employed, of course, to the extent necessary to cure the resin. After hardening, the fiber composite formed generally contains from about 40 percent by volume to about 60 percent by volume, of fiber, and from about 40 percent by volume to about 60 percent by volume of resin.

An epoxy resin binder system is preferably employed in producing the drive shafts of this invention because it is easy to handle and provides excellent temperature and environmental resistance. Such system comprises an epoxy resin together with a reactive epoxy resin hardener and/or an epoxy polymerization catalyst in an amount conventionally used in the art to cure epoxy resins.

The following examples are set forth for purposes of illustration so that those skilled in the art may better understand this invention. It should be understood that they are exemplary only, and should not be contrued as limiting this invention in any manner. Tensile strength and Young's modulus of the fibers referred to in the examples and throughout the specification, unless otherwise indicated, were measured on 10 cm. length unidirectional fiber-epoxy composites. The Young's modulus of the shafts were measured by supporting the shaft at both ends and applying a load at the center of the shaft.

EXAMPLE 1

Ten rovings of "Thornel"* 300 carbon yarn (a single ply, 1717 denier, carbon yarn containing 3000 filaments wherein the filaments are characterized by an average Young's modulus of 34 × 10⁶ psi. and an average tensile strength of 360 × 10³ psi.) were passed through an epoxy resin binder system and wrapped circumferentially, by means of a filament winding machine, about a steel mandrel at an angle of 87° to a line in the mandrel parallel to the longitudinal axis of the mandrel so as to completely cover the mandrel without overlapping upon itself or leaving any space between the turns. The epoxy resin binder system was composed of 100 parts by weight of a commercially available liquid epoxy resin produced by the reaction of epichlorohydrin and 2,2-bis(4-hydroxyphenyl)propane (Epikote 828, manufactured by Shell Chemicals UK Ltd.) and 27 parts by weight of diaminodiphenylmethane (DDM epoxy resin hardener, manufactured by Anchor Chemical Co. UK Ltd.) The mandrel employed had a diameter of 2.54 inches and was coated with "Lecithin"*, a commercial release agent. After the initial circumferential wrap had been completely wound about the mandrel, 180 rovings of the same carbon yarn were immersed in the epoxy resin binder and helically wound, by means of the same filament winding machine, about the mandrel at an angle of 22.5° to a line parallel to the longitudinal axis of the mandrel. A second helical wrap of 180 rovings was then wound about the mandrel in the opposite direction at an angle of 22.5° to a line parallel to the longitudinal axis of the mandrel so that the fibers thereof crossed the fibers of the first helical wrap at an angle of 45° (the smaller of the two angles formed by the intersection of the two fiber wraps is 45°). Four additional helical wraps of 180 rovings were then wound about the mandrel in like manner so that the fibers of each successive wrap crossed the fibers of each previous wrap at an angle of 45° and formed an angle of 22.5° with a line parallel to the longitudinal axis of the mandrel. Each helical wrap was, of course, immersed in the epoxy resin binder before being wound on the mandrel, and was wound so as to completely cover the previous wrap without overlapping upon itself or leaving any space between the turns. Finally, another circumferential wrap was wound about the mandrel in the same manner as the initial circumferential wrap using 10 rovings of yarn as in the initial wrap. Each of the layers applied in this manner was 0.010 inches thick.

*"Thornel" is a registered trademark of Union Carbide Corporation.
*"Lecithin" is a registered trademark of Wynmouth, Lehr and Fatoils.

The wrapped mandrel was then placed in an oven and heated at a temperature of 165° C. for 110 minutes in order to cure the epoxy resin and produce a monolithic shaft about the mandrel. The mandrel was rotated at 4–5 rpm. during this time in order to prevent asymetric resin drain to one side of the mandrel. At the end of this time, the mandrel was removed from the oven and allowed to cool. The cured resin shaft was then removed from the mandrel, and trimmed at both ends to a 50 inch length. Universal joints were then inserted into and bonded to both ends of the shaft.

The shaft was found to have a longitudinal Young's modulus of elasticity of 6 × 10⁶ psi. The product of this modulus times the second moment of area of the shaft (0.59 inch⁴) divided by the length of the shaft to the fourth power (50⁴) was found to be 0.57, i.e., $$EI/L^4 = 0.57$$

where
 $E$ = longitudinal Young's modulus of the shaft (psi.)
 $L$ = length of the shaft (inches), and
 $I$ = second moment of area of the shaft (inches⁴), i.e., $\pi r^3 t$, where $r$ is the mean radius of the shaft (inches), and $t$ is the thickness of the shaft walls (inches)

This value indicated that the shaft could be rotated at speeds of at least 6000 rpm. with minimum noise.

The value obtained from the formula (0.57) was found to be 43 times greater than the product of the mean shaft diameter (2.62 inches) times the thickness of the shaft walls (0.084 inches) times the average density of the shaft wall (0.06 lb./in.³), i.e., $$EI/L^4 DPt = 43$$

wherein
 $E$, $I$ and $L$ are as defined above, and
 $D$ = mean diameter of the shaft (inches)
 $P$ = average density of the shaft wall (lb./in³), and
 $t$ = thickness of the shaft walls (inches)

This value indicated that the shaft could be rotated at speeds of at least 6000 rpm. free of whirling.

The shaft produced in this manner was tested on a chassis dynamometer in an anechoic chamber (echo proof room) in conjunction with an engine having a crankshaft speed of 6000 rpm. The shaft was found to operate free of whirling, and to substantially eliminate the noise and vibration associated with drive shafts employed in such engines.

EXAMPLE 2

A drive shaft was prepared in the same manner as in Example 1 except that a mixture of "Thornel" 300 carbon yarn and "Kevlar" 49 yarn (a single ply, 1420 denier polyamide fiber yarn containing 1000 filaments wherein the filaments are characterized by an average Young's modulus of 13 × 10⁶ psi., and an average tensile strength of 525 × 10³ psi.) was employed, and the mixture was wrapped around a mandrel having a diameter of 3.04 inches. Ten rovings of the two yarns alternated in parallel were used to form the first and last circumferential wraps, and 180 rovings of the two yarns alternated in like manner were used to form the six intermediate helical wraps.

The hybrid shaft produced was found to have a longitudinal Young's modulus of elasticity of 3.6 × 10⁶ psi. The product of this modulus times the second moment of area of the shaft (1.35 inch⁴) divided by the length of the shaft to the fourth power (50⁴) was found to be 0.78, i.e., $$EI/L^4 = 0.78$$

where $E$, $I$ and $L$ are as above defined. This value was found to be 53 times greater than the product of the mean shaft diameter (3.15 inches) times the thickness of the shaft walls (0.110 inches) times the average density of the shaft wall (0.042 lb./in.³), i.e., $$EI/L^4DPt = 53$$

where $E$, $I$, $L$, $D$, $P$ and $t$ are as defined above. These values indicated that the shaft could be rotated at speeds of at least 6000 rpm. free of whirling and with minimum noise.

The shaft produced in this manner was tested on a chassis dynamometer in an anechoic chamber (echo free room) in conjunction with an engine having a crankshaft speed of 6000 rpm. The shaft was found to operate free of whirling, and to substantially eliminate the noise and vibration associated with drive shafts employed in such engines.

EXAMPLE 3

A drive shaft was prepared in a manner similar to Example 1 employing glass fibers for the helical wraps which were wound at an angle of 45° to a line parallel to the longitudinal axis of the shaft. In order to impart sufficient stiffness to the shaft, however, it was necessary to insert four plys of carbon fibers parallel to the longitudinal axis of the shaft. These plys were inserted as prepreg sheets between the helical wraps and the outermost circumferential wrap. Each ply was 0.005 inch thick, and contained fibers characterized by an average Young's modulus of about 30 × 10⁶ psi. and an average tensile strength of about 300 × 10³ psi.

The hybrid shaft produced was found to have a longitudinal Young's modulus of elasticity of 6.56 × 10⁶ psi. The product of this modulus times the second moment of area of the shaft (0.72 inch⁴) divided by the length of the shaft to the fourth power (50⁴) was found to be 0.76, i.e., $$EI/L^4 = 0.76$$

where $E$, $I$ and $L$ are as above defined. This value was found to be 52 times greater than the product of the mean shaft diameter (2.64 inches) times the thickness of the shaft walls (0.100 inches) times the average density of the shaft wall (0.055 lb./in.³), i.e., $$EI/L^4DPt = 52$$

where $E$, $I$, $L$, $D$, $P$ and $t$ are as defined above. These values indicated that the shaft could be rotated at speeds of at least 6000 rpm. free of whirling and with minimum noise.

The shaft produced in this manner was tested on a chassis dynamometer in an anechoic chamber (echo free room) in conjunction with an engine having a crankshaft speed of 6000 rpm. The shaft was found to operate free of whirling, and to substantially eliminate the noise and vibration associated with drive shafts employed in such engines.

What is claimed is:

1. A tubular drive shaft having noise and vibration dampening characteristics, and capable of being rotated at a speed of at least 6000 rpm. without misalignment between its geometric axis and its axis of rotation, said shaft having a maximum longitudinal Young's modulus of elasticity of 8 × 10⁶ psi. and comprising a composite of a plurality of layers of filamentary material in a solid resin matrix, said filamentary material being at least 20 percent by weight carbon fibers, with from at least 10 percent by weight to no more than 20 percent by weight of the filamentary material present being disposed parallel to the longitudinal axis of said shaft when filamentary material having a Young's modulus below 25 × 10⁶ psi. is employed, the balance of said filamentary material being circumferentially and helically disposed about the longitudinal axis of the shaft, the fibers in the innermost and outermost layers being substantially circumferentially disposed about the longitudinal axis of the shaft at an angle of from 85° to 90° to a line parallel to the longitudinal axis of the shaft, said circumferentially disposed fibers containing carbon fibers, and the fibers of at least four intermediate layers between the innermost and outermost layers being helically disposed about the longitudinal axis at an angle of from 15° to 50° to a line parallel to the longitudinal axis of the shaft, with the fibers of each successive helical layer crossing the fibers of the previous helical layer at an angle of from 30° to 90°; the value of the formula $$EI/L^4$$

for said shaft being no greater than 1, and the value of the formula $$EI/L^4DPt$$

for said shaft being at least 40, wherein
 $E$ is the longitudinal Young's modulus of the shaft (psi.),
 $I$ is the second moment of area of the shaft (inches⁴),
 $L$ is the length of the shaft (inches),
 $D$ is the mean diameter of the shaft (inches),
 $P$ is the average density of the shaft wall (lb./in.³), and
 $t$ is the thickness of the shaft wall (inches).

2. A tubular drive shaft as in claim 1 containing from 40 percent by weight to 65 percent by weight of filamentary material other than carbon fibers.

3. A tubular drive shaft as in claim 1 wherein the solid resin matrix is an epoxy resin matrix.

4. A tubular drive shaft as in claim 3 containing from 40 percent by weight to 65 percent by weight of filamentary material other than carbon fibers.

5. A tubular drive shaft as in claim 1 wherein all the fibers present to the shaft are carbon fibers having a Young's modulus of elasticity of at least 25 × 10⁶ psi.

6. A tubular drive shaft as in claim 5 wherein the soild resin matrix is an epoxy resin matrix.

7. A tubular drive shaft as in claim 5 wherein the innermost and outermost layers of carbon fibers are disposed circumferentially about the longitudinal axis of the shaft at an angle of 87° to a line parallel to the longitudinal axis of the shaft, and 6 to 8 intermediate layers of carbon fibers are disposed helically about the longitudinal axis at an angle of 22.5° to a line parallel to the longitudinal axis of the shaft, with the fibers of each successive helical layer crossing the fibers of the previous helical layer at an angle of 45°.

8. A tubular drive shaft as in claim 7 wherein the solid resin matrix is an epoxy resin matrix.

9. A tubular drive shaft as in claim 1 having a length of from 40 to 50 inches, an inner diameter of from 2 to 3 inches, and walls at least 0.06 inches thick.

10. A tubular drive shaft as in claim 9 having a maximum longitudinal Young's modulus of elasticity of $6 \times 10^6$ psi.

11. A tubular drive shaft as in claim 1 having a maximum longitudinal Young's modulus of elasticity of $6 \times 10^6$ psi.

12. A tubular drive shaft as in claim 9 containing from 40 percent by weight to 65 percent by weight of filamentary material other than carbon fibers.

13. A tubular drive shaft as in claim 12 having a maximum longitudinal Young's modulus of elasticity of $6 \times 10^6$ psi.

14. A tubular drive shaft as in claim 9 wherein the solid resin matrix is an epoxy resin matrix.

15. A tubular drive shaft as in claim 14 having a maximum longitudinal Young's modulus of elasticity of $6 \times 10^6$ psi.

16. A tubular drive shaft as in claim 14 containing from 40 percent by weight to 65 percent by weight of filamentary material other than carbon fibers.

17. A tubular drive shaft as in claim 16 having a maximum longitudinal Young's modulus of elasticity of $6 \times 10^6$ psi.

18. A tubular drive shaft as in claim 9 wherein all the fibers present in the shaft are carbon fibers having a Young's modulus of elasticity of at least $25 \times 10^6$ psi.

19. A tubular drive shaft as in claim 18 having a maximum longitudinal Young's modulus of elasticity of $6 \times 10^6$ psi.

20. A tubular drive shaft as in claim 18 wherein the solid resin matrix is an epoxy resin matrix.

21. A tubular drive shaft as in claim 20 having a maximum longitudinal Young's modulus of elasticity of $6 \times 10^6$ psi.

22. A tubular drive shaft as in claim 18 wherein the innermost and outermost layers of carbon fibers are disposed circumferentially about the longitudinal axis of the shaft at an angle of 87° to a line parallel to the longitudinal axis of the shaft, and 6 to 8 intermediate layers of carbon fibers are disposed helically about the longitudinal axis at an angle of 22.5° to a line parallel to the longitudinal axis of the shaft, with the fibers of each successive helical layer crossing the fibers of the previous helical layer at an angle of 45°.

23. A tubular drive shaft as in claim 22 having a maximum longitudinal Young's modulus of elasticity of $6 \times 10^6$ psi.

24. A tubular drive shaft as in claim 22 wherein the solid resin matrix is an epoxy resin matrix.

25. A tubular drive shaft as in claim 24 having a maximum longitudinal Young's modulus of elasticity of $6 \times 10^6$ psi.

26. A tubular drive shaft as in claim 1 wherein the fibers present in the innermost and outermost circumferential layers, as well as any fibers disposed parallel to the longitudinal axis of the shaft, are carbon fibers, and the fibers present in the helically disposed intermediate layers are glass fibers.

27. A tubular drive shaft as in claim 26 wherein the solid resin matrix is an epoxy resin matrix.

28. A tubular drive shaft as in claim 26 wherein the carbon fibers present in the innermost and outermost circumferential layers are disposed about the longitudinal axis of the shaft at an angle of 87° to a line parallel to the longitudinal axis of the shaft, and the glass fibers present in the intermediate helical layers are disposed about the longitudinal axis at an angle of 45° to a line parallel to the longitudinal axis of the shaft, with the fibers of each successive helical layer crossing the fibers of the previous helical layer at an angle of 90°.

29. A tubular drive shaft as in claim 28 wherein the solid resin matrix is an epoxy resin matrix.

30. A tubular drive shaft as in claim 12 wherein the fibers present in the innermost and outermost circumferential layers, as well as any fibers disposed parallel to the longitudinal axis of the shaft, are carbon fibers, and the fibers present in the helically disposed intermediate layers are glass fibers.

31. A tubular drive shaft as in claim 30 having a maximum longitudinal Young's modulus of elasticity of $6 \times 10^6$ psi.

32. A tubular drive shaft as in claim 30 wherein the solid resin matrix is an epoxy resin matrix.

33. A tubular drive shaft as in claim 32 having a maximum longitudinal Young's modulus of elasticity of $6 \times 10^6$ psi.

34. A tubular drive shaft as in claim 30 wherein the carbon fibers present in the innermost and outermost circumferential layers are disposed about the longitudinal axis of the shaft at an angle of 87° to a line parallel to the longitudinal axis of the shaft, and the glass fibers present in the intermediate helical layers are disposed about the longitudinal axis at an angle of 45° to a line parallel to the longitudinal axis of the shaft, with the fibers of each successive helical layer crossing the fibers of the previous helical layer at an angle of 90°.

35. A tubular drive shaft as in claim 34 having a maximum longitudinal Young's modulus of elasticity of $6 \times 10^6$ psi.

36. A tubular drive shaft as in claim 34 wherein the solid resin matrix is an epoxy resin matrix.

37. A tubular drive shaft as in claim 36 having a maximum longitudinal Young's modulus of elasticity of $6 \times 10^6$ psi.

* * * * *

UNITED STATES PATENT OFFICE
CERTIFICATE OF CORRECTION

Patent No. 4,089,190   Dated May 16, 1978

Inventor(s) Gordon Peter Worgan et al.

It is certified that error appears in the above-identified patent and that said Letters Patent are hereby corrected as shown below:

Column 1, line 61, "disigned" should read -- designed --.

Column 4, line 31, "preferably" should read -- preferable --.

Column 5, line 7, the comma after "volume" should be deleted.

Column 5, line 25, "undi-" should read -- unidi- --.

Column 8, line 65, "to" should read -- in --.

Column 10, line 29, "12" should read -- 9 --.

Signed and Sealed this

Twenty-fourth Day of October 1978

[SEAL]

Attest:

RUTH C. MASON
Attesting Officer

DONALD W. BANNER
Commissioner of Patents and Trademarks